W. J. STAKE.
TRACTOR.
APPLICATION FILED NOV. 12, 1918.

1,333,512.

Patented Mar. 9, 1920.
3 SHEETS—SHEET 1.

Walter J. Stake
Inventor

By Geo. P. Kimmel
Attorney

W. J. STAKE.
TRACTOR.
APPLICATION FILED NOV. 12, 1918.
1,333,512.
Patented Mar. 9, 1920.
3 SHEETS—SHEET 3.
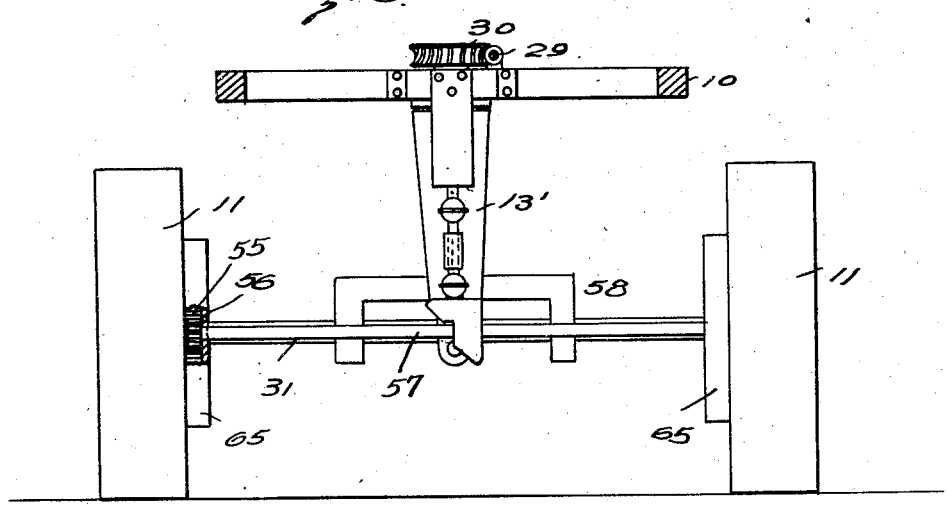
Fig. 3.
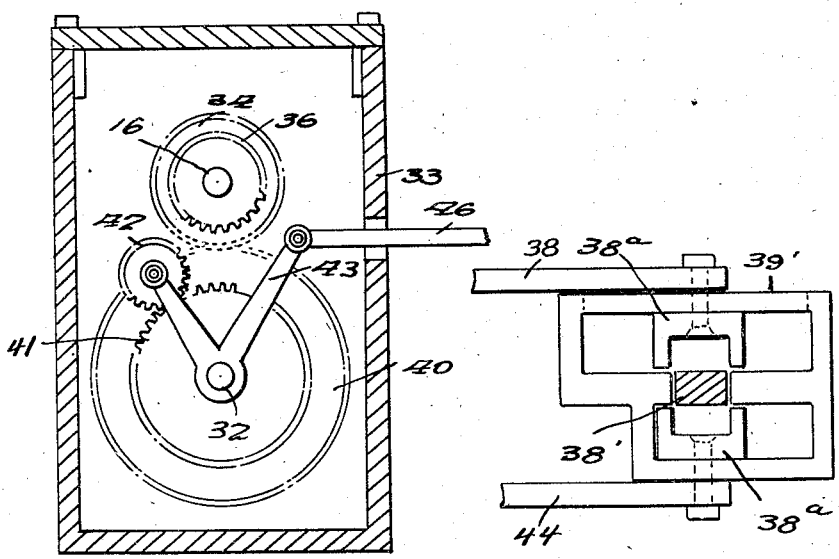
Fig. 4.
Fig. 5.
Walter J. Stake
Inventor
By Geo. P. Kimmel
Attorney

UNITED STATES PATENT OFFICE.

WALTER J. STAKE, OF SUGAR BUSH, WISCONSIN.

TRACTOR.

1,333,512.

Specification of Letters Patent.  Patented Mar. 9, 1920.

Application filed November 12, 1918. Serial No. 262,165.

*To all whom it may concern:*

Be it known that I, WALTER J. STAKE, a citizen of the United States, residing at Sugar Bush, in the county of Waupaca and State of Wisconsin, have invented certain new and useful Improvements in Tractors, of which the following is a specification.

This invention relates to the class of motor vehicles and more particularly to an improved tractor.

The object of the invention is to provide an improved tractor having a four wheel drive capable of control in a novel manner and which is so constructed as to permit the tractor to be turned at a very sharp angle, in which instance the drive is wholly through the front wheels while the rear wheels are idle.

A further object of the invention is to provide novel control means for independently throwing into or out of operation, all of the drive wheels, or throwing the rear wheels out independently of the forward wheels, so that the forward wheels can be turned for propelling the device when it is desired to make a short turn, all of the parts being under control.

A further object of the invention is to provide a steering means capable of operation from the motor and thereby giving the effect of turning a vehicle with a draft animal attached to the forward running gear thereof, as well as to provide means for driving various machinery when the tractor is standing still, thereby making thorough use of the device for various purposes around a farm or other like places.

With the above and other objects in view, my invention comprises the novel features of construction, combination of elements and arrangement of parts which will be more fully described in the following specification and then finally embodied in the clauses of the claim which are appended hereto and which form an essential part of the same.

Reference is had to the accompanying drawings forming a part of this application, wherein like reference characters will refer to corresponding parts throughout the several views, in which—

Fig. 3 is a transverse sectional view showing the front drive,

Fig. 4 is a vertical section through the transmission casing showing the arrangement of the reverse gearing, and Fig. 5 is a fragmentary detail partly in section showing the arrangement of the control means and lever.

Figure 1:
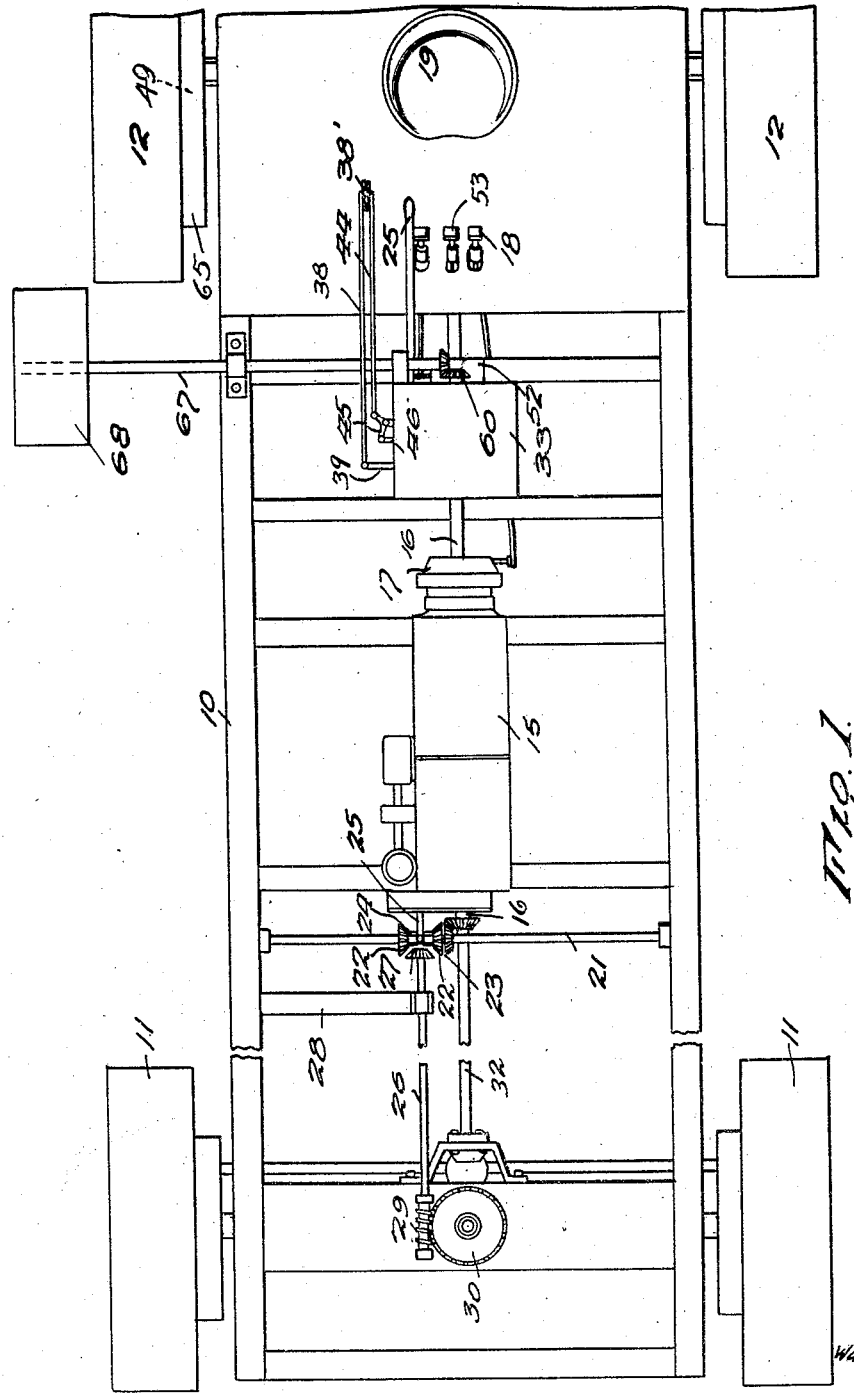
Figure 1 is a plan view of my improved tractor.
Figure 2:
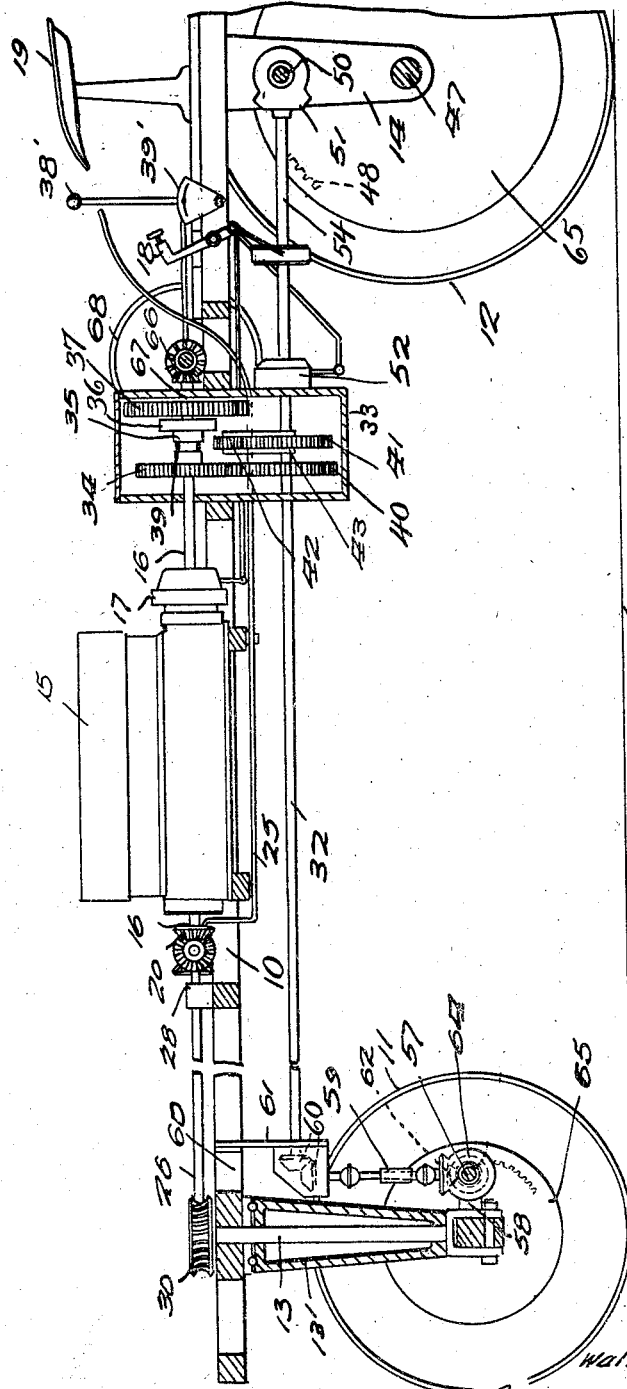
Fig. 2 is a central longitudinal sectional view thereof.

Referring to the drawings in detail, my improved tractor is shown as comprising a chassis or frame 10 suitably supported upon the front drive wheels 11 and the rear drive wheels 12 by the front steering post 13 and the hangers 14 respectively; the post passing through a bearing table 13'. Supported upon the chassis or frame is a motor 15, having the drive shaft 16, the same being under control through the medium of a general or service clutch 17 capable of operation through the medium of a foot pedal 18 having suitable connections therewith. This foot pedal is located adjacent to the driver's seat indicated at 19, mounted upon the rear of the frame or chassis for directing the movements of the vehicle, as will be hereinafter more fully explained.

The shaft 16 extends forwardly and is geared by miter gears as shown at 20, with a transverse shaft 21 journaled in the opposed sides of the frame. The shaft 21 carries a pair of oppositely disposed gears 22 and 23 fixed upon a hub or sleeve 24 splined upon the shaft 21 and adapted to be shifted longitudinally thereof through the medium of a lever 25 extending rearwardly into convenient position for manipulation by the operator. Disposed at right angles to the shaft 21 is a shaft 26, the same carrying a miter gear 27 at its rear end adapted to be driven by engagement with either of the gears 22 or 23 from the shaft 21, so as to impart opposite rotation to the shaft 26 for steering the vehicle in different directions, depending upon the direction in which the sleeve or hub 24 is shifted. The shaft 26 may be preferably journaled in the frame as by means of a transverse bearing 28 and has at the forward end thereof, a worm 29 designed to mesh with a worm gear 30 fixed to the upper end of the steering post 13, so that the front wheels and the axle 31 can be turned for effectively steering the vehicle at very sharp angles substantially at right angles to the frame.

In order to impart rotary movement to the front wheels and to the rear wheels simultaneously or for independently driving the front wheels while the rear wheels remain idle, a shaft 32 is journaled beneath the frame coincident with its longitudinal axis interposed between the shaft 32 and the shaft 16 is a transmission which is mounted within a casing 33. This transmission includes a gear 34 fixed to move with a sleeve 35 upon the shaft 16, which sleeve is splined on the shaft and also carries a smaller gear 36 and a large gear 37, all of said gears being designed to be shifted simultaneously upon the shifting of the sleeve 35, through the medium of a connecting link 38 having connection with the sleeve through the medium of a pivoted lever 39 formed at its inner end to engage the sleeve. Mounted upon the shaft 32 is a large gear 40 adapted when in mesh with the gear 34 to produce a low speed drive, while high speed is obtained through the meshing of the gear 37 with a gear 41 also fixed to the shaft 32, upon the shifting of the sleeve 35 for this purpose.

In order to produce a reverse drive, there is provided an intermediate or idler gear 42 which is journaled upon the end of an angle lever 43 pivoted to the shaft 32 and designed to be thrown between the gears 36 and 41 for imparting reverse rotation to the shaft 32, by way of a link 44 having connection therewith through the medium of a bell crank lever 45 and a connecting rod or link 46. It is also to be understood that when the gears are out of mesh, the shaft 32 will not be driven, although said shaft is to be controlled through the medium of the clutch 17 for all service purposes.

The rear axle is designated 47 and the wheels 12 rotatable thereon are designed to be driven from the shaft 32 and to be thrown out of operation while the front wheels are being driven. For this purpose each wheel 12 carries a bull gear 48 disposed in mesh with pinions 49 mounted upon the ends of a shaft 50 arranged transversely of the frame in the hangers 14. This shaft is driven from the shaft 32 through the medium of miter gears 51 and a clutch 52 designed to be controlled through the medium of a foot lever or the like 53, to throw the rear drive into and out of operation by connecting the stub-shaft 54 with the shaft 32 or disconnecting it as will be understood.

To effect manual shifting of the gears to establish the desired driving relations, a control lever 38′ is mounted on the chassis adjacent a guide bracket 39′, said bracket being formed with longitudinal parallel ways communicating through the cutaway portion of the bracket in order that the control lever can be shifted into one or the other, said lever 38′ having the usual ball and socket connection whereby to permit oscillating of the same in order that it can be moved into the desired longitudinal way in the guide bracket previous to the shifting of the same to establish the desired driving relation. Substantially U-shaped brackets 38ᵃ are slidably arranged in the longitudinal ways of the bracket 39′ and are connected by bolts to the adjacent ends of the links 38 and 44; the brackets being so arranged as to permit the engagement of the control lever 38′ therein. In order that sliding motion can be imparted to the particular link connected thereto for establishing the proper driving relation, it is of course to be understood that the control lever 38′ is located at a point convenient to the operator's seat whereby it may be readily grasped.

The forward end of the shaft 32 is equipped to drive the forward wheels 11 forming the steering wheels of the tractor, and for this purpose the wheels 11 carry internal gears 55 with which mesh pinions 56 carried upon the ends of a shaft 57, the latter being preferably journaled as by means of brackets 58 attached to the front axle 31. A universally jointed shaft 59 is connected by beveled gearing 60 arranged in a suitable casing and supported on the forward portion of the chassis by a bracket 61 with the adjacent end of the drive shaft 32, the lower end thereof carrying a beveled gear 62 meshing with a similar gear arranged on the shaft 57, these last gears being also provided with a suitable casing 64. Obviously, due to the provision of the vertically disposed universally jointed shaft 59, movement of the steering wheels of the vehicle with relation to the driving shaft 32 will be allowed. The gearings including the drive connections at the wheels are preferably inclosed in housings, as indicated at 65, so as to protect all of the parts from sand, dirt and other foreign matter to prevent interference with the operation thereof, it being understood that said gearings are to be retained in a thoroughly lubricated condition by a suitable lubricant placed in the housings. Means are also provided to drive various machinery, such as threshing machines and the like, and the shaft 16 is geared at its rear end as shown at 66 through the medium of miter gears, with a transverse shaft 67 carrying upon its end a belt pulley 68 adapted to be operatively connected with the machinery to be driven therefrom and controlled by a suitable clutch (not shown).

In the operation of the device, when the vehicle is being propelled by all four wheels, the clutch 17 is thrown in and also the clutch 52. If the gear 34 is disposed in mesh with the gear 40 by shifting the sleeve 35 through the medium of the link 38 and lever 38′, the rotation transferred to the shaft 32 and thus to the bull gears, will constitute the low speed drive. For high speed, the gear 37 will be disposed in mesh with the gear 41 and for driving reversely, the gear 36 is disposed in alinement with the gear 41 and the gear 42 thrown into operative position between said gears through the medium of the levers 44 and 45 and connecting rod or link 46 as heretofore explained. Should it be desired to turn the vehicle, it may be turned while both the front and rear wheels are being driven, by throwing the gears 22 and 23 alternately into mesh with the intermediate gear 27, depending upon the direction to which it is desired to turn. However, this turning may be affected to give a very short turn, by throwing out the clutch 52 so as to impart rotation to the front wheels and allowing the rear wheels to remain still and forming substantially a pivot for the tractor as the latter turns.

From the foregoing description taken in connection with the accompanying drawings, it is thought that a clear and comprehensive understanding of the construction, operation and advantages of my invention may be had, and while I have shown and described the device as embodying a specific structure, I desire that it be understood that such changes may be made in said structure as do not depart from the spirit and scope of the invention as claimed.

Having thus described my invention, what I claim as new, and desire to secure by Letters Patent, is:

A tractor comprising a wheeled truck having positively driven front and rear pairs of tractor wheels, a motor on the truck, a steering post having hangers for engagement with an axle for the front wheels, a bearing table surrounding said post and interposed between the truck and said axle, a worm gear on the upper end of the post, connections between the rear wheels and said motor, connections between the front wheels of said motor, shafts journaled in the truck and disposed at right angles to each other, a worm screw on one of the shafts and meshing with the worm gear, gears between the other shaft and the connections between the front wheels and said motor, and manually controlled means transmitting motion from one of the shafts to the other and also for reversing the direction of travel of one of said shafts.

In testimony whereof, I affix my signature hereto.

WALTER J. STAKE.